United States Patent [19]

Teramachi

[11] 3,938,854

[45] Feb. 17, 1976

[54] TRACK SHAFT — BED OF BALL BEARING

[76] Inventor: Hiroshi Teramachi, 8-34-2, Higashi-tamagawa, Setagaya, Tokyo, Japan

[22] Filed: Oct. 7, 1974

[21] Appl. No.: 512,456

[30] Foreign Application Priority Data

Oct. 19, 1973 Japan............................ 48-120712

[52] U.S. Cl................................................ 308/6 R
[51] Int. Cl.² ...................................... F16C 29/04
[58] Field of Search ............ 308/3 R, 6 R, 6 B, 6 C

[56] References Cited
UNITED STATES PATENTS 3,113,807  12/1963  Polidor............................. 308/6 R Primary Examiner—M. Henson Wood, Jr.
Assistant Examiner—Gene A. Church
Attorney, Agent, or Firm—McGlew and Tuttle

[57] ABSTRACT

A machine slide comprises an elongated bar having two opposite sides with respective upper portions having respective arcuate surfaces with circumferentially spaced apart cylindrical recesses extending along the length thereof having ball bearings therein. A saddle member has a circularly cylindrical recess with a bottom having an opening into which the bar extends and which is engaged on the ball bearings of the bar for movement thereon. The sides of the bar have respective stop recesses below the arcuate surfaces into which respective bottom edges of the saddle which bound the recess extend.

1 Claim, 3 Drawing Figures

TRACK SHAFT — BED OF BALL BEARING

BACKGROUND OF THE INVENTION

1. FIELD OF THE INVENTION

The present invention relates in general to ball bearing slides, and in particular to an improved track rod forming guides for ball bearings arranged on an arcuate part thereof.

2. DESCRIPTION OF THE PRIOR ART

The known ball slides include saddle parts which are engageable over trackways and which ride on the trackways on ball bearings. The known constructions are of comparatively large size and they have the disadvantage that a non even loading of the saddle member which rides on the trackway may cause an unbalancing of the bearing and a misalignment and destruction.

SUMMARY OF THE INVENTION

The present invention is an improvement over the prior art primarily in the construction of a machine slide which includes an elongated bar which has two opposite sides with respective portions which have arcuate surfaces and which include circumferentially spaced apart cylindrical recesses having ball bearings therein. The ball bearings are engaged by a saddle member which has a circularly cylindrical recess with a bottom opening for receiving the bar therein. The bar also has respective stop recesses below the arcuate surfaces into which the bottom end edges of the saddle member bounding the recess extend. The advantage of the invention is that the device will ride evenly on the ball bearing structure regardless of whether the loading is even or uneven. The saddle is constructed so that the cylindrical recess of the saddle will permit the saddle to shift arcuately on its mounting on the ball bearings only to the extent that the bottom edges of the recess of the saddle member bear against the stop recesses defined on the bar.

Accordingly it is an object of the invention to provide an improved slide having ball bearings contained in grooves which are defined on arcuate surfaces on each side of a supporting trackway or bar and wherein a saddle member having a cylindrical recess into which the bar extends is provided with end edges on each end of the recesses which bear into stop recesses of the bar.

A further object of the invention is to provide an improved machine slide which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
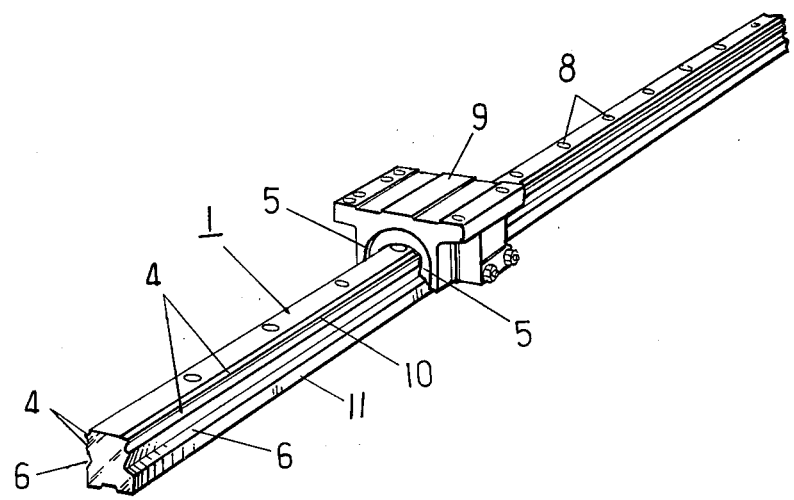
FIG. 1 is a prespective view of an improved track shaft-bed of ball bearing according to the present invention.
Figure 2:
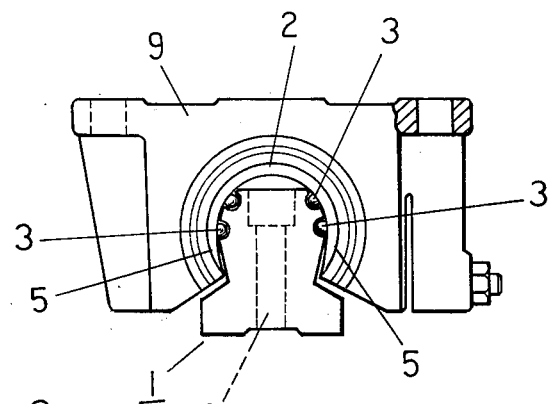
FIG. 2 is an elevational view of FIG. 1.
Figure 3:
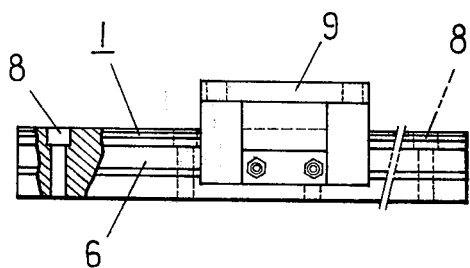
FIG. 3 is a magnified side view of FIG. 1.

Preferring to FIGS. 1 through 3, there is shown an improved track shaft-bed assembly of ball bearing according to the present invention. The track shaft-bed assembly includes a straight square bar 1 with two opposite sides each having a pair of circumferentially spaced apart cylindrical receway grooves 4,4 for balls 3 arranged on respective arcuate surfaces or shoulder portion 1, thereby forming a track shaft part 10. In addition grooves 6,6 on respective sides of the bar 1 located below the arcuate portion form stop recesses for corresponding bottom edges of the sleeve 5 of the arcuate ball bearing race 2 are provided on the bottom of the bar 1. Below the two grooves 6 there is a vertical bed part 11. A plurality of fixing or mounting slots 8 extend through the bar 1 in the vertical direction at spaced locations along the longitudinal length of the bar 1. A reference numeral 9 in FIGS. 1 through 3 is a saddle member which provides a mounting for a machine tool.

The track bar 1 according to the present invention is locked on a bed of a machine, such to form planing machine as a guide member for receiving stud bolts of a machine part which are inserted in a plurality of slots of the part and threaded into corresponding screw holes of the bar.

The improved track shaft-bed according to the present invention is simple in construction and easy to manufacture and has the following advantages; namely, it may be made of a small-size, higher degree of accuracy and lower in cost than prior track shaft-bed constructions.

While a specific embodiment of the invention has been shown and described in detail to illustrate the application of the principles of the invention, it will be understood that the invention may be embodied otherwise without departing from such principles.

What is claimed is:

1. A machine slide comprising an elongated bar having two opposite sides with respective upper portions having respective arcuate surfaces with a plurality of circumferentially spaced apart cylindrical recesses each of said recesses having ball bearings therein, and a saddle member having a circularly cylindrical recess and with a bottom having a lower opening into which the bar extends, said saddle member being engaged on said ball bearings for movement thereon, said sides of said bar having a respective stop recess below the respective arcuate surface into which the respective bottom edges bounding the saddle member cylindrical recess extends.

* * * * *